United States Patent
Kirchberg et al.

(10) Patent No.: US 8,098,917 B2
(45) Date of Patent: Jan. 17, 2012

(54) AUTOMATICALLY UPDATING A GEOMETRIC MODEL

(75) Inventors: Klaus J. Kirchberg, Princeton, NJ (US); Christine H. Lorenz, Frederick, MD (US)

(73) Assignee: Siemens Aktiengesellschaft, München (DE)

( * ) Notice: Subject to any disclaimer, the term of this patent is extended or adjusted under 35 U.S.C. 154(b) by 857 days.

(21) Appl. No.: 12/120,313

(22) Filed: May 14, 2008

(65) Prior Publication Data

US 2008/0285831 A1 Nov. 20, 2008

Related U.S. Application Data

(60) Provisional application No. 60/938,739, filed on May 18, 2007.

(51) Int. Cl.
*G06K 9/00* (2006.01)
(52) U.S. Cl. .......................... 382/131; 382/128; 382/132
(58) Field of Classification Search .................. 382/128, 382/131, 132
See application file for complete search history.

(56) References Cited

U.S. PATENT DOCUMENTS

| | | | | |
|---|---|---|---|---|
| 5,995,644 | A * | 11/1999 | Lai et al. | 382/131 |
| 7,031,506 | B2 * | 4/2006 | Tsujii et al. | 382/132 |
| 7,295,691 | B2 * | 11/2007 | Uppaluri et al. | 382/130 |
| 7,492,375 | B2 * | 2/2009 | Toyama et al. | 345/629 |
| 7,643,035 | B2 * | 1/2010 | Toyama et al. | 345/589 |
| 2003/0120145 | A1 * | 6/2003 | Schmitz et al. | 600/407 |
| 2006/0050943 | A1 * | 3/2006 | Ozaki et al. | 382/131 |
| 2006/0109285 | A1 * | 5/2006 | Chan et al. | 345/642 |
| 2006/0274928 | A1 * | 12/2006 | Collins et al. | 382/132 |

OTHER PUBLICATIONS

Whaite et al., Autonomous Exploration: Driven by Uncertainty, IEEE Transactions on Pattern Analysis and Machine Intelligence, Mar. 1997, 19(3), pp. 193-205.
Kirchberg et al., Modeling the Human Aorta for MR-Driven Real-Time Virtual Endoscopy, MICCAI 2006, LNCS 4190, pp. 470-477, Oct. 2006.
Lorenz et al., Interactive Frontend (IFE): A Platform for Graphical MR Scanner Control and Scan Automation, Proc. Intl. Soc. Mag. Reson. Med. 13 (May 2005) p. 2170.
Kirchberg et al. Real-Time Virtual Endoscopy for MR-Guided Aortic Interventions, Proc. Intl. Soc. Mag. Reson. Med. 14 (May 2006).

* cited by examiner

*Primary Examiner* — Andrew W Johns
*Assistant Examiner* — Shefali Goradia
(74) *Attorney, Agent, or Firm* — Donald B. Paschburg; F. Chau & Associates, LLC.

(57) ABSTRACT

A computer implemented method for automatically updating a geometric model of an object of interest includes determining, automatically, a region of the geometric model for updating according to a update parameter, acquiring data at the region, extracting features from the acquired data, updating the geometric model described by the extracted features, wherein updating the model includes calculating at least one acquisition parameter of a set of acquisition parameters, and displaying a scene showing the object of interest using the model.

15 Claims, 3 Drawing Sheets

AUTOMATICALLY UPDATING A GEOMETRIC MODEL

CROSS-REFERENCE TO RELATED APPLICATIONS

This application claims the benefit of Provisional Application No. 60/938,739 filed on May 18, 2007 in the United States Patent and Trademark Office, the contents of which are herein incorporated by reference in its entirety.

BACKGROUND OF THE INVENTION

1. Technical Field

The present disclosure relates to image processing, and more particularly to a system and method for automatically updating a geometric model of anatomy or function using actively requested acquisition data from an imaging device.

2. Description of Related Art

Magnetic Resonance Imaging (MRI) has become one of the most important imaging modalities for medial diagnostics. Although the diagnoses are still often based upon human inspection of the acquired image material, the development of sophisticated image post-processing and analysis methods can greatly support physicians in their decisions for treatment. Combining image analysis results with physics-based prior knowledge leads to mathematical models of anatomy and/or function, which can be used to visualize structures and processes inside the body, like the beating human heart. Furthermore, quantitative measure can be derived from the model, that could otherwise not be measured non-invasively, e.g., ejection fraction, which is an important indicator of the heart's efficiency.

Moving from traditional diagnostic (offline) imaging to MRI guided intervention, scanning can be performed continuously and the model of choice can be updated directly with the gathered data. Models relevant in this scenario can be topological maps to guide the operator, but also models that provide quantitative data for monitoring the progress of the intervention.

In currently available interventional MRI (iMRI) systems, guidance is either purely image-based or using a geometrical model retrieved semi-automatically from a pre-acquired dataset and kept static throughout the process. In many real-time scenarios however, a dynamic representation of the anatomy is required that constantly adapts to changes of position and shape over time. One application example is an interventional procedure, where a graphical visualization of the model helps the physician to drive a catheter. Here the model has to reflect the current form and state of the organ(s) of interest in the best way possible. Depending on the application, the optimal tradeoff between spatial and temporal detail can vary.

In a simple case, the complete set of relevant image data is acquired over and over, each time fitting the anatomic model to the most recent data. Although this can be a viable solution if the necessary amount of data can be acquired at a reasonable frequency, in most practical scenarios a higher update rate is desirable. In many applications, only a certain subset of model parameters requires a frequent update. In the example of a 3D model used for navigation by the operator, the local region around the catheter tip is of most interest, and thus needs most frequent updates. If the parameter subset can be mapped to a certain locality of the input data, the updating procedure can be accelerated by repeatedly acquiring only this region.

In image guided procedures, "roadmap" images are used to enable visualization of devices used in the procedure, and to allow the operator to avoid critical structures. Roadmap images typically are acquired prior to a procedure and give an overview of the anatomy and/or function targeted for the procedure. Ideally one would like to have these roadmap images updated continuously, but limitations in acquisition speed, radiation exposure, procedure time, etc. limit the rate at which one can update the images.

In current image guided systems, the user must acquire an entirely new roadmap image or set of images. There are methods to represent the age of roadmap images during x-ray guided procedures, slowly fading out the roadmap image at a preset rate to give the operator a visual clue that the roadmap is outdated. The operator is thus triggered to acquire a new roadmap image. The disadvantage of the current systems is that they exist only for fluoroscopy, and only in the simple method described above. No automated update strategies for MR (Magnetic Resonance) guided interventions currently exist.

Therefore, a need exists for a system and method for automatically updating a geometric model.

SUMMARY OF THE INVENTION

According to an embodiment of the present disclosure, a computer implemented method for automatically updating a geometric model of an object of interest includes determining, automatically, a region of the geometric model for updating according to a update parameter, acquiring data at the region, extracting features from the acquired data, updating the geometric model described by the extracted features, wherein updating the model includes calculating at least one acquisition parameter of a set of acquisition parameters, and displaying a scene showing the object of interest using the model.

According to an embodiment of the present disclosure, a system for automatically updating a geometric model of an object of interest includes a graphical user interface, a scanner in data communication with the graphical user interface, receiving a scan command from the graphical user interface and returning image data to the graphical user interface, and a controller, wherein the controller requests data from the scanner, and wherein the controller provides position data and at least one update parameter of a set of update parameters to the scanner, wherein the controller includes a update program that extracts an update parameter from the data and determines a region of the geometric model to update according to the update parameter.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
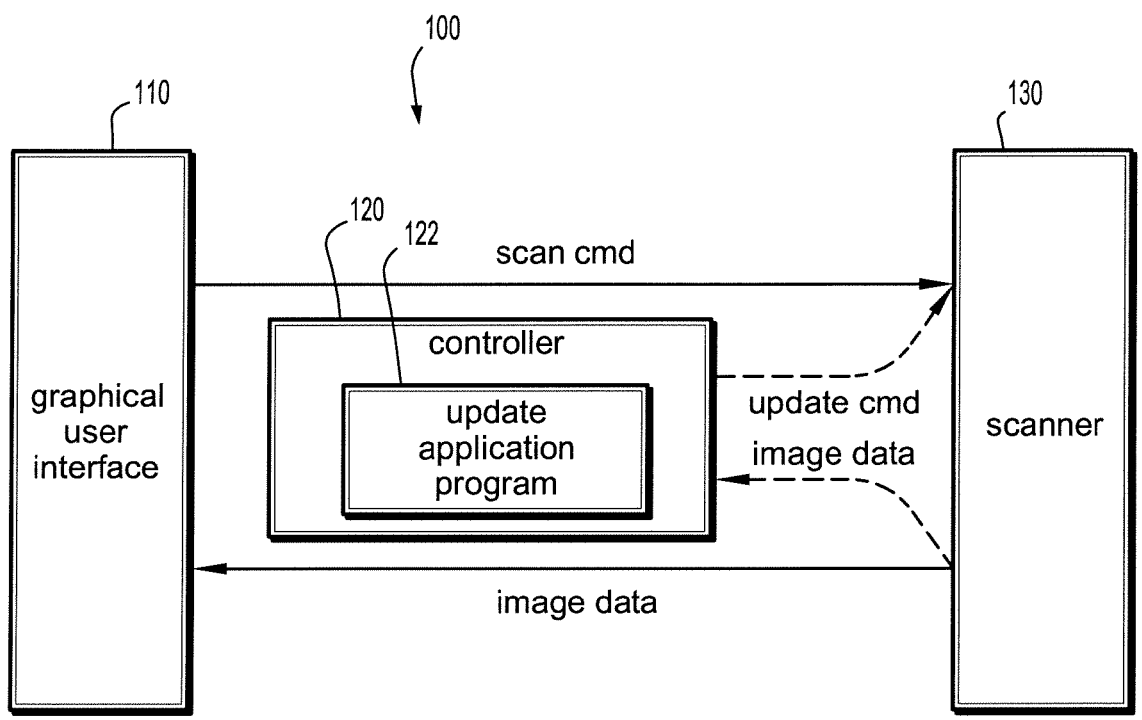
FIG. 1 is scanning system according to an embodiment of the present disclosure.

According to an embodiment of the present disclosure, a method adjusts the (e.g., optimizes) acquisition of images during an image guided procedure by automatically directing a scanner to acquire new image data at a specific location or temporal phase based on information relevant to a current procedure. For example, if an operator determines that images should be updated in a region close to a catheter tip or needle used in the procedure to assure that the target is in the correct location before injection, this method could combine detection of the device (catheter, needle, etc.) with automatic direction to the scanner to update images at the tip of the needle, and subsequent update of the display presented to the user.

Data is only updated when needed, thus reducing time for acquisition and redisplay of roadmap data, and reducing radiation dose in the case of fluoroscopic imaging. The data can be updated at higher spatial or temporal resolution, or with a different image contrast if needed, to provide more precise information at the targeted site. A system implementing a method according to an embodiment of the disclosure allows the user to determine the criteria for the updates based on the procedure type—for example, in some procedures, curvature of a vessel might be important to capture accurately, while in others, visualization of a lesion to a high degree of spatial accuracy might be most important. The user may select both the criteria for updates and the error tolerance.

In iMRI, acquisition parameters (slice position, orientation, slice thickness, etc.) can be changed interactively during the procedure without stopping the scanner. Parameters can be modified either manually by the operator, or in an automatic fashion, e.g., by the image processing unit. By giving the modeling process control over the data acquisition, the model can actively request data updates for specific regions.

According to an embodiment of the present disclosure, a system actively acquires image data and uses the acquired data to continuously update a geometric model. Data acquisition is controlled in a way that some criteria describing the local model detail are optimized, i.e., to actively acquire image data in locations that yield the best improvement with respect to these criteria. This newly gathered information is incorporated in the model by updating its parameters accordingly. Having an always up-to-date model can lower the risk of errors by the physician.

Various methodologies can be applied for model driven updating. The following exemplary factors may be used to determine a region to update at a certain time.

Spatial and temporal accuracy requirement—defines a lower bound for the model detail, both in space and time.

Local risk—a function specific to a certain procedure that reflects the impact or cost of model inaccuracies in a region.

Age of data—indicator of how recently an area of the model was last updated.

Area of interest—variable regions that are most important at the current stage of operation, defined for example by a catheter tip position or the current field of view for the model's 3D visualization.

Confidence—a measure representing the reliability and expected accuracy of the source data and/or model fitting.

These and other factors can be used independently or in a weighted combination depending on the application area.

Although the concepts are outlined here in the context of iMRI, one or more may be applied to other imaging modalities, e.g., x-ray fluoroscopy, computed tomography (CT) or ultrasound imaging.

Referring to FIG. 1, the scanning system 100 includes a graphical user interface 110, controller 120, and scanner 130 in data communication with the graphical user interface 110.

It is to be understood that the scanning system 100 may include a CT scanner in lieu of, or in addition to, the scanner 130, and that various imaging modalities are suitable for implementing embodiments of the invention. The controller 120 requests data from the scanner 130, determines a region of the geometric model to update, and provides position data to the scanner 130.

As shown in FIG. 1, the controller 120 includes an update program 122 that evaluates the data to extract at least one update parameter. The update program 122 is an application running on a computer system. The controller 120 may determine a value of a predetermined weighted combination of two or more update parameters for determining the region of the geometric model to update.

The update parameter may be a function identifying a cost for model inaccuracies in the region, wherein the geometric model is updated upon determining that the cost is greater than a threshold for inaccuracies. According to another exemplary embodiment, the update parameter is a threshold for an age of the data, wherein the geometric model is updated upon determining that the data is older than the threshold. The update parameter may be a set of priorities for different regions within the geometric model, wherein the different regions are updated according to the set of priorities. In another exemplary embodiment, the update parameter is a threshold for confidence of the data, wherein the geometric model is updated upon determining that the confidence of the data is lower than the threshold.

External applications can connect from personal computers (PCs) in a local network to send a scan and/or update command (cmd in FIG. 1) and receive the corresponding reconstructed image data. For example, it provides a socket connection that can receive scan commands from an external PC in the same network. Scan and update commands may contain information such as scan position, slice orientation, pulse sequence parameters, a network address defining the location to which the image data is sent, etc. In an exemplary embodiment of the present invention, all network communication is done via TCP/IP sockets.

After the scanner system 130 has finished extracting images from the acquired data, the data is sent to the network socket defined in the scan command. In addition, the image server may send position data and orientation as well as phase encoding and readout direction along with the image—these parameters define the correspondence between image pixel coordinates and real world coordinates.

To interactively manipulate and visualize the scan planes, according to an exemplary embodiment of the present invention, a graphical user interface 110 communicates with the scanner 130. In an exemplary embodiment of the present invention, the graphical user interface 110 displays the scanned slices in a three dimensional (3-D) renderer. The graphical user interface 110 may comprise one or more two dimensional (2-D) or 3-D scene visualizations of image data, model and/or data extracted from the model, and graphical controls to interact with the scenes.

Figure 2:
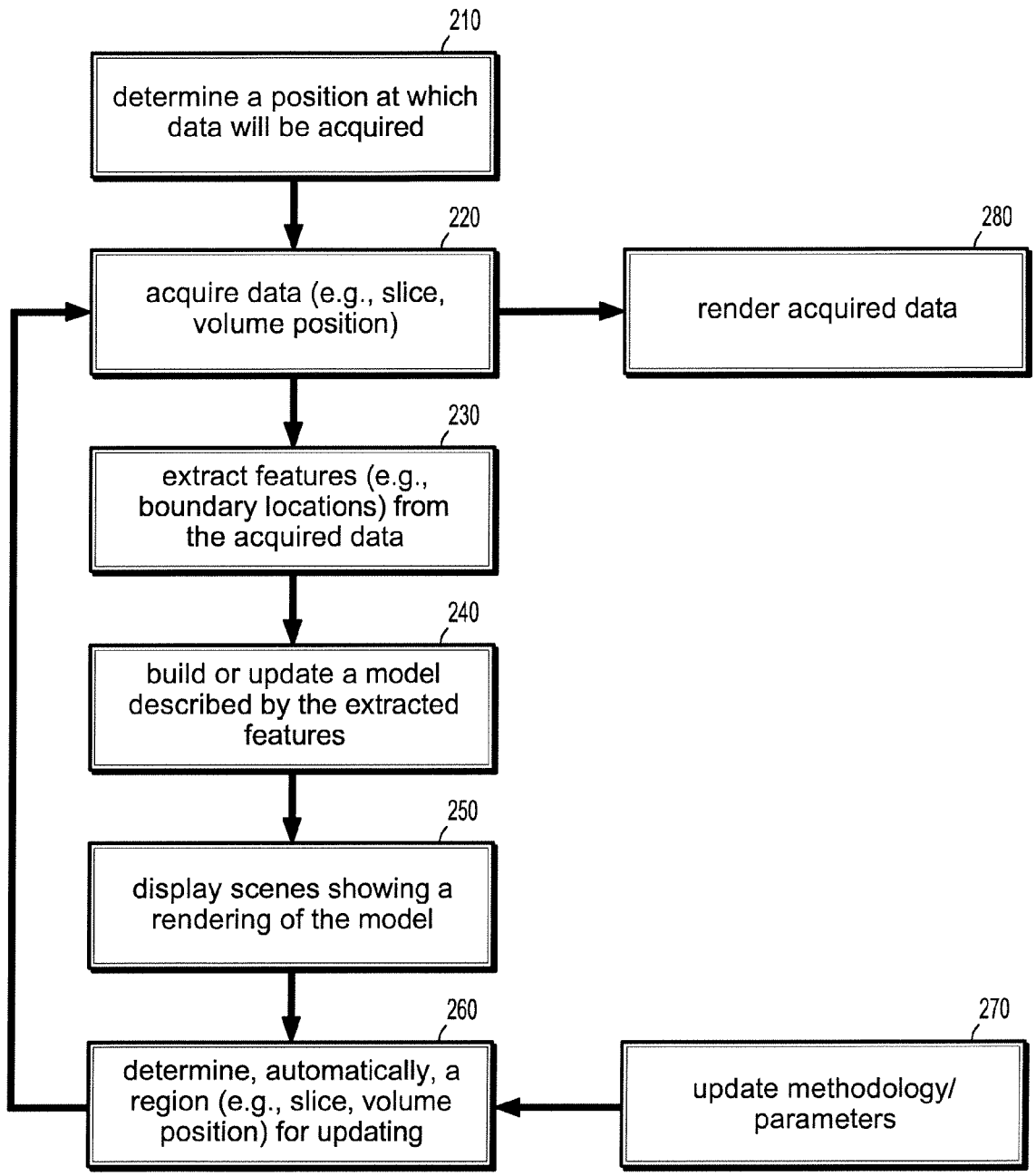
FIG. 2 is a flow chart for automatically updating a geometric model according to an embodiment of the present disclosure.

FIG. 2 is a flowchart showing a method of real-time 3-D visualization and navigation for interventional procedures, according to an exemplary embodiment of the present invention. Referring to FIG. 2, at block 210, a position is determined at which data will be acquired, e.g., a position which includes a view of a heart. Determining a position where data is acquired can be done either automatically or interactively.

At block 220, data is acquired at the position. In an exemplary embodiment of the present invention, acquiring data comprises obtaining anatomical data and/or functional data derived from at least one imaging modality. For example, acquiring data may comprise performing an MR scan at the position to obtain anatomical data and/or functional data.

Features are extracted from the acquired data, at block 230. Extracting features may comprise finding boundaries between a plurality of regions in the image. For example, the regions may correspond to the interior or the surface of an organ. As used herein, "organ" refers to an organ or anatomical structure. Extracting features may comprise segmenting the data.

It should be noted that for purposes of the present disclosure and appended claims that the term "feature" is to be inclusive of image features such as edges and corners, and further-include low/high level features and appearance data, for example, pixel values, image intensities, etc.

At block 240, a model described by the extracted features is built or updated. Updating the model includes calculating at least one acquisition parameter of a set of acquisition parameters. The set of acquisition parameters includes, but is not limited to, position data, orientation data, timing data, and MR contrast data. It is contemplated that the data can be used directly for rendering without building a model (block 280).

At block 250, 3-D scenes are displayed showing the interior or exterior of one or more organs using the model or data extracted from the model. In an exemplary embodiment of the present invention, displaying 3-D scenes includes allowing a user to interact with the 3-D scenes.

At block 260, a region and time for updating is determined. In an exemplary embodiment of the present invention, the 3-D scenes are continuously updated or real-time updated using the region for updating, on-line MR acquisition, segmentation, and/or modeling.

Referring to block 260, the region for updating is determined according to at least one of spatial and temporal accuracy requirements of an application, local risk, the age of data, an area of interest, and confidence of data and the model.

Region updating at block 260 is performed according to a selected update methodology and parameters. For example, a user may select a spatial and temporal based methodology to be performed automatically that defines a lower bound for the model detail, both in space and time. Thus, in a case where a rendered scene does not meet the lower bound for space (e.g., a catheter is within 100 millimeters of an edge of a rendered scene) and time (e.g., no update in the last two seconds), a region for updating is determined. In another example, a local risk function may be implemented for updating the model for a determined region upon determining that performing a certain procedure, e.g., zooming, will result in inaccuracies in the region above a threshold.

For slice or volume position data, at block 220, slice or volume data may be derived from the at least one imaging modality. The acquired slice or volume data may comprise pixels or voxels. At block 230, boundary locations are extracted from the acquired slice or volume data. This may involve segmenting the acquired slice or volume data. A segmentation is specified by associating the pixels or voxels with either one of a plurality of regions. In an exemplary embodiment of the present invention, extracting boundary locations comprises determining locations in the image that are between a plurality of regions. At block 240, a model is built or updated using the extracted boundary locations. Updating the model includes calculating at least one acquisition parameter of a set of acquisition parameters. The set of acquisition parameters includes, but is not limited to, position data, orientation data, timing data, and MR contrast data. Building a model may include using prior knowledge of anatomy and/or anatomical function. It is contemplated that the data can be used directly for rendering without building a model. At block 250, 3-D scenes showing the interior or exterior of one or more organs are displayed using the model or data extracted from the model. At block 260, a slice or volume position for updating is calculated according to a selected update methodology and parameter 270.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 3:
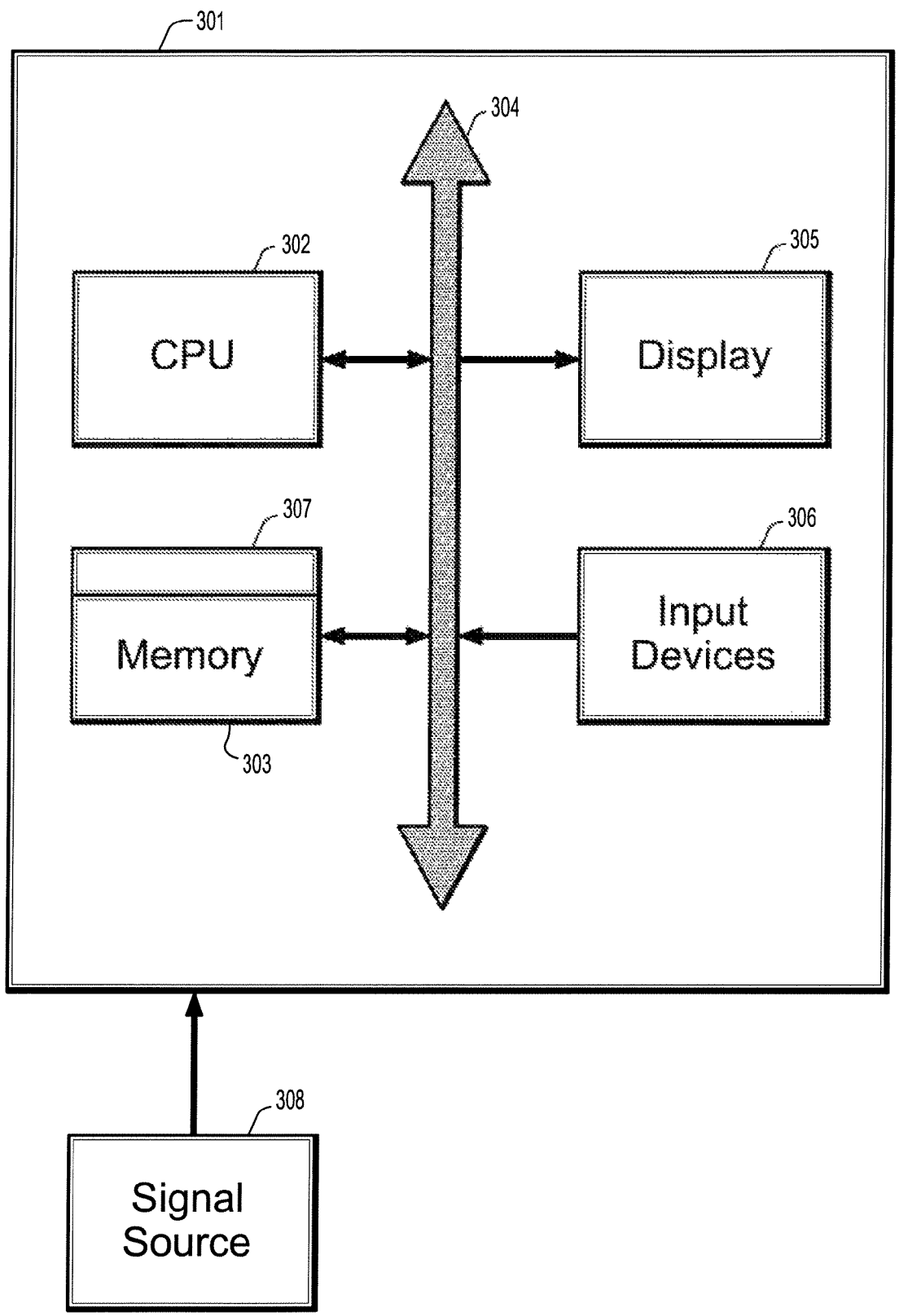
FIG. 3 is a computer system for implementing methods according to an embodiment of the present disclosure.

Referring to FIG. 3, according to an embodiment of the present invention, the graphical user interface 110, controller 150, and scanner 120 (see FIG. 1) may be implemented on one or more computer systems 301. As such the computer system 301 may be cased to automatically update a geometric model. The computer system 301 comprises, inter alia, processor 302 such as a central processing unit (CPU) or a digital processing device, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. The present invention can be implemented as a routine 307 that is stored in memory 303 and executed by the processor 302 to process the signal, e.g., volumetric data of an object of interest, from the signal source 308. As such, the computer system 301 is a general purpose computer system that becomes a specific purpose computer system when executing the routine 307 of the present invention.

The computer platform 301 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

An exemplary embodiment of the computer platform 301 implements a combination of OpenInventor and C++ embedded in the RadBuilder rapid application development framework with links to syngo, the Siemens common operating environment. The computer platform 301 may be connected via ethernet to the scanner host computer (e.g., Siemens Avanto), or can run directly on the scanner host computer.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for automatically updating a geometric model, it is noted that modifications and variations can be made by persons skilled in the art in light of the above teachings. It is therefore to be understood that changes may be made in embodiments of the present disclosure that are within the scope and spirit thereof.

What is claimed is:

1. A computer implemented method for automatically updating a geometric model of an object of interest comprising:
determining, automatically, a region of the geometric model for updating according to first parameter defining when to update the geometric model;
acquiring data at the region guided by at least one acquisition ara parameter defining in how to update the geometric model;
extracting features from the data acquired at the region;
updating the geometric model described by the extracted features, wherein updating the geometric model includes modifying the at least one second parameter for controlling the acquisition of new data; end
displaying a scene showing the object of interest using the geometric model updated by the extracted features of the data at the region.

2. The computer implemented method of claim 1, wherein the first parameter defines a lower bound for model detail, wherein the geometric model is updated upon determining that the lower bound for model detail is lower than the lower bound.

3. The computer implemented method of claim 1, wherein the first parameter is a function identifying a cost for model inaccuracies in the region, wherein the geometric model is updated upon determining that the cost is greater than a threshold for inaccuracies.

4. The computer implemented method of claim 1, wherein the first parameter is a threshold for an age of the data, wherein the geometric model is updated upon determining that the data is older than the threshold.

5. The computer implemented method of claim 1, wherein the first parameter is a set of priorities for different regions within the geometric model, wherein the different regions are updated according to the set of priorities.

6. The computer implemented method of claim 1, wherein the first parameter is a threshold for confidence of the data, wherein the geometric model is updated upon determining that the confidence of the data is lower than the threshold.

7. The computer implemented method of claim 1, wherein determining, automatically, the region of the geometric model for updating according to the first parameter further comprises determining a value of a predetermined weighted combination of two or more first parameters.

8. A non-transitory computer readable medium having program instructions stored thereto for implementing the computer implemented method claimed in claim 1 when executed in a processor.

9. The computer implemented method of claim 1, wherein the second parameter for controlling the acquisition of new data controls at least one of position, orientation, timing, and contrast of a scanner device.

10. A system for automatically updating a geometric model of an object of interest, comprising:
a graphical user interface;
a scanner in data communication with the graphical user interface, receiving a scan command from the graphical user interface and returning image data to the graphical user interface; and
a controller, wherein the controller requests the image data from the scanner, and wherein the controller provides at least one first parameter and a second parameter to the scanner, wherein the controller includes an update program that evaluates the image data to extract a first parameter defining the region of the geometric model to update and when to update the region of the geometric model and the second parameter controlling how to acquire new image data at the region of the geometric model.

11. The system of claim 10, wherein the first parameter is at least one of a spatial and temporal accuracy requirement, a local risk, an age of the data, an area of interest in the image data, and a confidence in the image data.

12. The system of claim 11, wherein the controller determines a value of a predetermined weighted combination of two or more first parameters for determining the region of the geometric model to update.

13. The system of claim 10, wherein the graphical user interface renders a view of the image data returned by the scanner.

14. The system of claim 10, wherein the region is less than the entire geometric model.

15. The system of claim 10, wherein the second parameter for controlling the acquisition of new data controls at least one of position, orientation, timing, and contrast of the scanner.

* * * * *